US 12,470,667 B2

(12) United States Patent
Skwarek et al.

(10) Patent No.: US 12,470,667 B2
(45) Date of Patent: Nov. 11, 2025

(54) AUTHENTICATION MODULE FOR SENSOR DATA

(71) Applicant: TRUSTNXT GMBH, Hamburg (DE)

(72) Inventors: Volker Skwarek, Wesenberg (DE); Mark Hebbel, Hamburg (DE); Sebastian Adank, Ahrensburg (DE)

(73) Assignee: TRUSTNXT GMBH, Hamburg (DE)

( * ) Notice: Subject to any disclaimer, the term of this patent is extended or adjusted under 35 U.S.C. 154(b) by 510 days.

(21) Appl. No.: 17/286,869

(22) PCT Filed: Oct. 17, 2019

(86) PCT No.: PCT/EP2019/078154
§ 371 (c)(1),
(2) Date: Apr. 20, 2021

(87) PCT Pub. No.: WO2020/083732
PCT Pub. Date: Apr. 30, 2020

(65) Prior Publication Data
US 2021/0385408 A1    Dec. 9, 2021

(30) Foreign Application Priority Data

Oct. 24, 2018   (DE) ..................... 10 2018 126 533.6

(51) Int. Cl.
*H04N 5/913*    (2006.01)
*H04L 9/32*    (2006.01)
*H04N 5/765*    (2006.01)

(52) U.S. Cl.
CPC ........... *H04N 5/913* (2013.01); *H04L 9/3242* (2013.01); *H04N 5/765* (2013.01); *H04N 2005/91342* (2013.01)

(58) Field of Classification Search
CPC .................. H04N 5/913; H04N 5/765; H04N 2005/91342; H04N 21/64715;
(Continued)

(56) References Cited

U.S. PATENT DOCUMENTS 6,535,618 B1 * 3/2003 Rhoads .............. H04N 1/32208
704/E19.009
10,164,973 B1 * 12/2018 Prasad ................ H04L 63/0861
(Continued)

FOREIGN PATENT DOCUMENTS

DE         10350993 A1 *   5/2005    ........... H04L 9/3236

OTHER PUBLICATIONS

International Searching Authority. International Search Report and Written Opinion for application PCT/EP2019/078154. With machine translation. Mailed on Dec. 5, 2019. 17 pages.

*Primary Examiner* — Mohammed Waliullah
(74) *Attorney, Agent, or Firm* — QUARLES & BRADY LLP

(57) ABSTRACT

An authentication module for a time series of sensor data is provided that comprises at least one data interface which can be connected to at least one sensor. An authentication interface and an authentication logic are provided which is coupled to the data interface and the authentication interface. The authentication logic is configured to receive at least one data set ($21a$-$24a$) via the at least one data interface from at least one sensor, form one or more compressed products ($21b$-$24b$) from one or more received data sets, create an authentication which contains the compressed products and respectively contains a reference to the associated data set, or at least a part of the associated data set, and output the authentication via the authentication interface.

11 Claims, 4 Drawing Sheets

Figure 1:
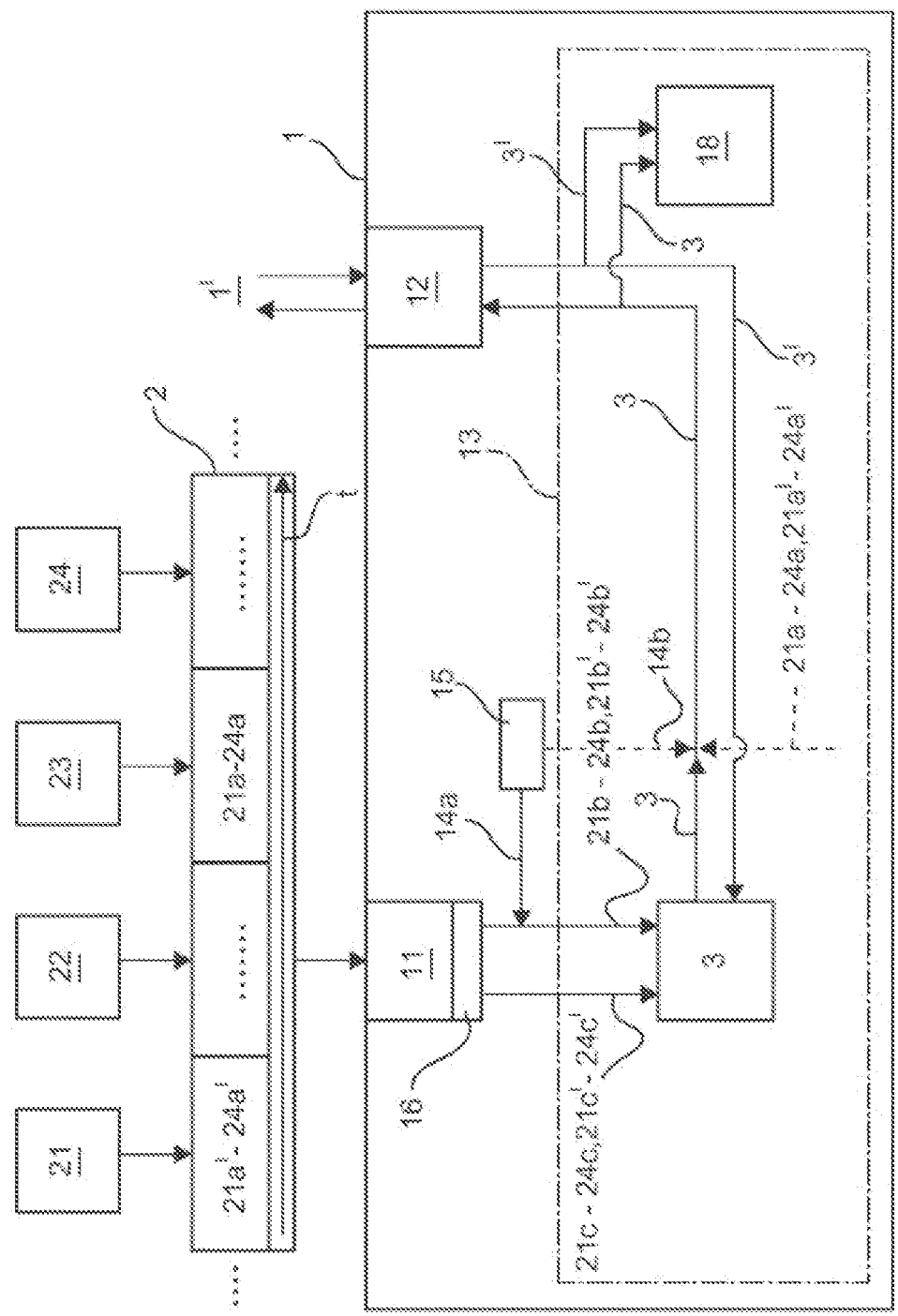

(58) Field of Classification Search
CPC ............. H04L 9/3242; H04L 2209/805; H04L 9/0877; H04L 9/3236; H04L 63/123; G06F 21/64
See application file for complete search history.

(56) References Cited

U.S. PATENT DOCUMENTS

| | | | |
|---|---|---|---|
| 11,622,257 B1* | 4/2023 | Mars | H04L 9/12 455/41.2 |
| 2014/0321640 A1* | 10/2014 | Johne | H04N 1/00339 380/28 |
| 2015/0317613 A1* | 11/2015 | Clark | G06Q 20/12 705/44 |
| 2018/0176503 A1* | 6/2018 | Kogata | H04N 21/8352 |
| 2018/0253567 A1* | 9/2018 | Gonzalez-Banos | H04N 21/8358 |
| 2020/0211002 A1* | 7/2020 | Steinberg | G06Q 20/385 |

* cited by examiner

AUTHENTICATION MODULE FOR SENSOR DATA

CROSS-REFERENCE TO RELATED APPLICATIONS

This application is a U.S. National Phase of International Application No. PCT/EP2019/078154 filed Oct. 17, 2019 which claims the benefit of priority to German Application No. 10 2018 126 533.6 filed on Oct. 24, 2018, which are herein incorporated by reference in their entirety.

The invention relates to an authentication module with which sensor data can be protected against subsequent manipulation and/or suppression, as well as a camera with this authentication module.

PRIOR ART

Before the storage of sensor data on digital media became standard, sensor data were stored in analog form, such as on magnetic tape, on chart recorders or on exposed film. The switch to digital media brings a significantly higher storage capacity at lower costs for storage media and at the same time also less equipment for the recording.

On the other hand, it has also become easier hereby to manipulate the recorded sensor data subsequently, such as images from surveillance cameras. For example, while a film that was once exposed could only be modified afterwards through physical editing, which inevitably left traces of processing on the film, most digital storage media can be deleted and rewritten without any recognizable physical traces indicating this. Recordings can thus, for example, be modified subsequently, for example retouched. Likewise, if a recording is completely or partially missing, it cannot be conclusively proven that it has existed.

Object and Solution

It is therefore the object of the invention to complicate the unnoticed subsequent processing, as well as the unnoticed partial or complete suppression, of sensor data.

This object is achieved according to the invention by a processing module according to the main claim and by a camera and a computer program according to the parallel claims. Further advantageous embodiments result from the subclaims that refer back to them.

DISCLOSURE OF THE INVENTION

In the context of the invention, an authentication module for a time series of sensor data was developed. These sensor data can contain arbitrary physically recorded measurement data, for example as still or moving camera images, temperature data or measurement data from acceleration sensors.

The authentication module comprises at least one data interface that can be connected to at least one sensor. Sensor data from one or more sensors can be supplied to the authentication module via these one or more data interfaces. In particular, combinations of several data interfaces can thus be provided that receive data from different sensors.

If the authentication module is integrated into a camera, for example, which in turn is connected to a wired or wireless network, the authentication module can receive camera images directly from the image sensor of this camera, for example via an internal interface of this camera. At the same time, however, the authentication module can also receive sensor data from other sensors in the area via additional data interfaces, such as radio interfaces. The authentication module can thus serve as a collection point for the sensor data from several sensors in a sensor network, for example.

The term camera includes, for example, two-dimensional or three-dimensional individual cameras, but also, for example, stereoscopic or other arrangements of cameras, the images of which are merged into a three-dimensional overall image. The camera can also merge, for example, multimodal data from several contrast mechanisms.

The authentication module also has an authentication interface via which it issues authentications. The distinction between the data interface and the authentication interface is thereby not to be understood to mean that these interfaces have to differ with regard to certain physical characteristics, but merely serves to better understand the processes in the authentication module. It is thus also possible that an authentication module can both receive sensor data from different sensors and output authentications via one and the same network interface.

The authentication module further has an authentication logic. This authentication logic can be implemented in hardware, software, firmware, or any combination thereof. The authentication logic is designed to receive at least one data set via the at least one data interface from at least one sensor and to form one or more compressed products from one or more received data sets.

A compressed product is understood to mean any condensed summary of the data set that a) does not allow any clear conclusion to be drawn about the data set or parts thereof and b) changes if a modification is made at an arbitrary point in the data set. This includes, in particular, cryptographic hash functions, which make it particularly difficult to generate a manipulated data set for a given data set and a given hash value that is mapped to the same hash value (so-called hash collision). However, considerations between the security level on the one hand and the hardware costs on the other hand can lead to the use of simpler functions for the formation of compressed products, such as checksums (e.g., CRC) or counts, which byte values from 0 to 255 occur how often in the data set.

The authentication logic creates an authentication which contains the compressed product(s) and respectively a reference to the associated data set and/or at least part of the associated data set. In this way, it is recorded in the authentication that the data set(s) to which the authentication relates had a certain content at the time of authentication, which is indicated by the compressed product(s). The authentication can additionally also contain time stamps or other information.

The authentication module is designed to output the authentication via the authentication interface. In particular, the authentication can be issued outside the device in which the authentication module is installed. For example, the authentication interface can be used to distribute authentications within a sensor network.

The ultimate effect of such a distribution is that at many places in the network the information is stored that at a certain point in time data sets of a certain content have been present. If the data sets are required at a later point in time, for example for evidence purposes, then it can be checked whether the data sets have been changed in the meantime by means of the authentications stored in the network or with a trusted entity. The storage of the authentication thereby respectively requires significantly less storage space than the storage of the original data sets due to the compaction in compressed products.

Thus, for example in the event of a dispute, the sensor data stored with respect to a sensor can be compared with the authentications available with respect to these sensor data. This can also include a check as to whether the nominally associated data set actually exists for every authentication that is present with respect to a sensor. If an authentication exists for a specific data set, but this data set cannot be found at the same time, then it may have been suppressed subsequently. For example, it can be attempted to remove those images from the time series of images supplied by a surveillance camera in which a perpetrator can be recognized. If authentications exist of these images, the existence of the images can no longer be denied.

In doing so, the distribution of authentications does not even have to end at the limits of the sphere of influence of an individual operator of a sensor network. Rather, the conclusiveness can be increased even further, for example by sending the authentications via a radio interface as an authentication interface and other authentication modules store each authentication received on their radio interface for at least a certain period of time, regardless of who it comes from. If, for example, a criminal offense is committed in a shop A equipped with a system of surveillance cameras and another company in the neighboring shop B operates a camera system from the same manufacturer (or a compatible one), the police can visit store B to preserve evidence and demand the surrender of the authentications stored in the camera system there. The operator of shop A thus no longer has the opportunity to conclusively deny the existence of certain recordings in his camera system. If he makes all cameras disappear and replaces them with new ones of the same type, then he can destroy the images themselves, but this act can be proven to him by means of the authentications. The authentications stored in store B are secure from his access.

Thus, in a particularly advantageous embodiment, the authentication logic is designed to receive and store authentications from other authentication modules and/or to include them in the own authentication. In addition, the authentication logic can also store the authentication it has created itself.

The output of authentications via the authentication interface is not restricted to the fact that the authentications are transferred to sensor devices of a sensor network and/or to central servers. The authentications can also be stored in a public blockchain, such as the Ethereum blockchain, for example. The storage there must be paid for in crypto currency, though it is unchangeable and indelible.

The distribution of the authentications reduces the requirements for the cryptographic security of the function with which compressed products are created in principle. Even if the function used for this is very simple, a subsequent falsification of a data set can still be recognized in that authentications with different compressed products are in circulation for one and the same data set.

In a further particularly advantageous embodiment, the authentication logic is additionally designed to include a reference to at least one earlier data set in the time series and/or a compressed product of this earlier data set in the authentication. In this way, a time chain of data sets, including their sequence, can be documented by the authentications. If, for example, a surveillance camera films a brawl, the sequence of the images can no longer be subsequently manipulated unnoticed in order to conceal who attacked and who defended himself.

If a hash value is formed as a compressed product, in a particularly advantageous embodiment it can be a keyed hash message authentication code that is calculated using a secret key of the authentication module. The hash value can then be clearly assigned to the specific authentication module that has the secret key. This means that the hash value can no longer be reproduced if the authentication module is exchanged for another with a different secret key. The secret key is therefore advantageously unique for the authentication module.

In a further particularly advantageous embodiment, the authentication logic is designed to store the authentication by means of steganographic modifications to a data set received from a sensor in the data set. In this context, a steganographic modification is understood to mean, in particular, a modification that is so small and/or inconspicuous that it does not influence and/or impair the further use and/or evaluation of the data set within the scope of the intended purpose for which it was recorded. For example, steganographic modifications of images are designed to be invisible when viewing the image with the human eye and thus do not to interfere with the further evaluation of the image by people. In this way, the data set, such as the image, can also be used as a vehicle for the transport of the authentication. It is not necessary to transport the authentication separately, and it is directly clear to which data set the authentication belongs.

Furthermore, a steganographic storage of the authentication, for example in an image, can also conceal that the image is secured by authentications in the first place. With such a concealment of the existing security measures, the aim can be pursued, for example, not to prevent attackers from manipulating the data sets from the outset, but to surprisingly uncover such a manipulation afterwards and to bring the perpetrator to justice.

Analogous to the keyed hash message authentication code, the steganographic modification can also be calculated using a secret key of the authentication module. For example, the positions in the data set at which the modifications are made can be determined from the secret key. The authentication can only be exchanged for a new one if the secret key is known. Without the secret key, it is not even possible to read the authentication from the data set or even to recognize that the data set contains an authentication.

The authentication module advantageously comprises a trusted platform module with the secret key of the authentication module. In this way, the authentication module can be equipped with a globally unique key, and conditions under which the key is used can be enforced in terms of hardware. For example, the key can be bound to a constant firmware configuration of the authentication module by "sealing" in the trusted platform module.

In a further particularly advantageous embodiment, the authentication module comprises a selector connected between the data interface and the authentication logic, which either sends the received data sets forward to the authentication logic according to at least one predetermined criterion or suppresses this forwarding. For example, the selector can be set to pass only every fifth image from a camera recording 25 images per second to the authentication logic. In this way, a compromise can be made between the level of security on the one hand and the calculating and storage effort for the authentication on the other hand. In the example mentioned, the effort is reduced to a fifth, while at the same time there is always a time window of 0.2 seconds between two images secured with authentications, in which manipulations of the images cannot be recognized directly by means of the authentications. So that the manipulation remains de facto undetected, it would also have to be consistent with all images secured by authentications. Otherwise, when looking at the time series of images, one would notice that there are sudden modifications that cannot be brought about by any natural sequence of movements at this speed.

Several selectors can also be easily used to send authentications that are to be sent to various other devices at different clock pulses. For example, several surveillance cameras and other sensors within a plant can be linked to one another by a WLAN, in which there is ample bandwidth and where authentications can be distributed for every image and every other data set from sensor data. However, if the plant does not have a fast landline connection to the internet, but can only issue authentications to the outside via a narrow-band connection, such as LoRaWAN, authentications can then be created for this purpose at sensible time intervals.

According to what has been described above, the invention also relates to a camera for recording still or moving images. This camera comprises at least one image sensor and the authentication module described above, the data interface of which is coupled to the image sensor of the camera.

In a further particularly advantageous embodiment, the authentication logic is designed to form compressed products from combinations of one or more received data sets with at least part of the firmware of the authentication logic and/or a device accommodating the authentication module. The compressed product can then only be reproduced identically from the data set(s) if not only the data set(s) themselves have remained unchanged, but also the firmware.

Independently of this, the authentication logic can also, for example, produce authentications of the firmware without looking at specific received data sets. In this way, manipulations of the firmware can already be detected before it is used to falsify or suppress data sets. For example, the firmware of a surveillance camera could have been manipulated by malware in such a way that it no longer updates the image at certain times or under certain other conditions or that a motion detector is deactivated.

A camera is inherently equipped with comparatively strong hardware resources and powerful interfaces in order to be able to cope with the large amounts of data supplied by the image sensor. Therefore, calculating capacity can advantageously be diverted there for the authentications. In particular, in a sensor network, a camera can form a collection point for sensor data from other sensors in the network. For example, the network can contain sensors in which, for reasons of cost or to reduce power consumption, the calculating capacity required for creating authentications was saved, such as temperature sensors with long-life batteries. The data from these sensors can then be authenticated on the camera. Typical surveillance networks contain a plurality of cameras, so that the authentication is then still carried out at several redundant locations.

Examples of sensor networks in which the camera can be used are sensor networks in companies in which, on the one hand, optical monitoring is required and, on the other hand, compliance with certain operating parameters must be documented conclusively. For example, temperature measurements can be used to monitor whether a prescribed cold chain is being adhered to. With sensors that register every opening of containers, as well as weight sensors on containers, the documentation requirement with regard to the whereabouts of certain chemical substances, which are suitable as base materials for the production of narcotics or explosives, can be satisfied. The chemical composition of waste water or exhaust air from a production plant can also be monitored with sensors. Furthermore, the whereabouts of devices, materials or data carriers that are at risk of theft can be monitored, for example, with RFID sensors.

A sensor network with the camera can also be used, for example, to make the recordings of so-called "dashcams" for vehicles more substantial and at the same time more conclusive. In addition to the camera image, other vehicle parameters such as speed, throttle position, steering angle, or switching states of the vehicle's lights can also be registered and authenticated, and the authentications can be distributed via "car to car" or "car to infrastructure" radio, for example. In this way, in the event of a legal dispute about the question of culpability, the records can still be conclusive even if they are not immediately secured by the police when the accident is recorded, but are only submitted subsequently voluntarily by a party or by order of the court.

By distributing the authentications in the sensor network and, as explained previously, possibly also beyond the limits of this sensor network, the sensor data can ultimately be protected against manipulation or suppression even without a central instance. The more widely the authentications are spread, the more difficult it is to remove all copies or to replace them with new versions.

In an advantageous embodiment, the authentication module is implemented on an image processing chip of the camera, which is directly coupled to the image sensor of the camera. In this way, the notifications can be integrated as early as possible into the data sets supplied by the image sensor of the camera and also protected as far as possible against access by other system components and by potentially harmful software.

According to what has been described above, the camera further comprises a memory which is coupled to the authentication module and which is designed to store authentications created and/or received by the authentication module.

The authentication module can, for example, be integrated into a mobile phone or another mobile terminal and there, for example, authenticate information with which the user can prove his identity to a service provider for mobile payment. If a mobile terminal or a computer is equipped with an authentication module, this authentication module can additionally, for example, authenticate the image data of a video session recorded by the mobile terminal or a webcam, in which the user presents an identification document for legitimation. In this way, the user can then, for example, prove his age online or comply with the identification requirement when opening an account or activating a SIM card.

Furthermore, for example, an authentication module can be used on a mobile phone to authenticate sensor data from wearable devices. These sensor data can be used, for example, to control low-risk behavior that a policyholder has committed to in return for reduced contributions to health insurance or motor vehicle insurance. By means of the authentication, manipulations with the aim of obtaining better evaluations can be made much more difficult. However, the sensor data can also be used, for example, after an accident as evidence with regard to the speed driven or the severity of an impact.

According to what has been described above, the authentication module can be embodied as a physical module and, in some embodiments, can use additional hardware, as for example a trusted platform module. However, there are also embodiments in which the authentication module is implemented entirely or partially in software that can be integrated, for example, into the firmware of a surveillance camera or another sensor device. Such a software is an independent product that is particularly relevant for retrofitting existing sensor networks. The invention therefore also relates to a computer program with machine-readable instructions, which, when they are executed on a computer, and/or on an embedded system, and/or on a camera, and/or on another sensor device, upgrade the computer, the embedded system, the camera, or the other sensor device to the previously described authentication module and/or expand it to such an authentication module, or upgrade the camera to the previously described camera. The invention also relates to a machine-readable data carrier or a download product with the computer program.

SPECIAL DESCRIPTION PART

Figure 2:
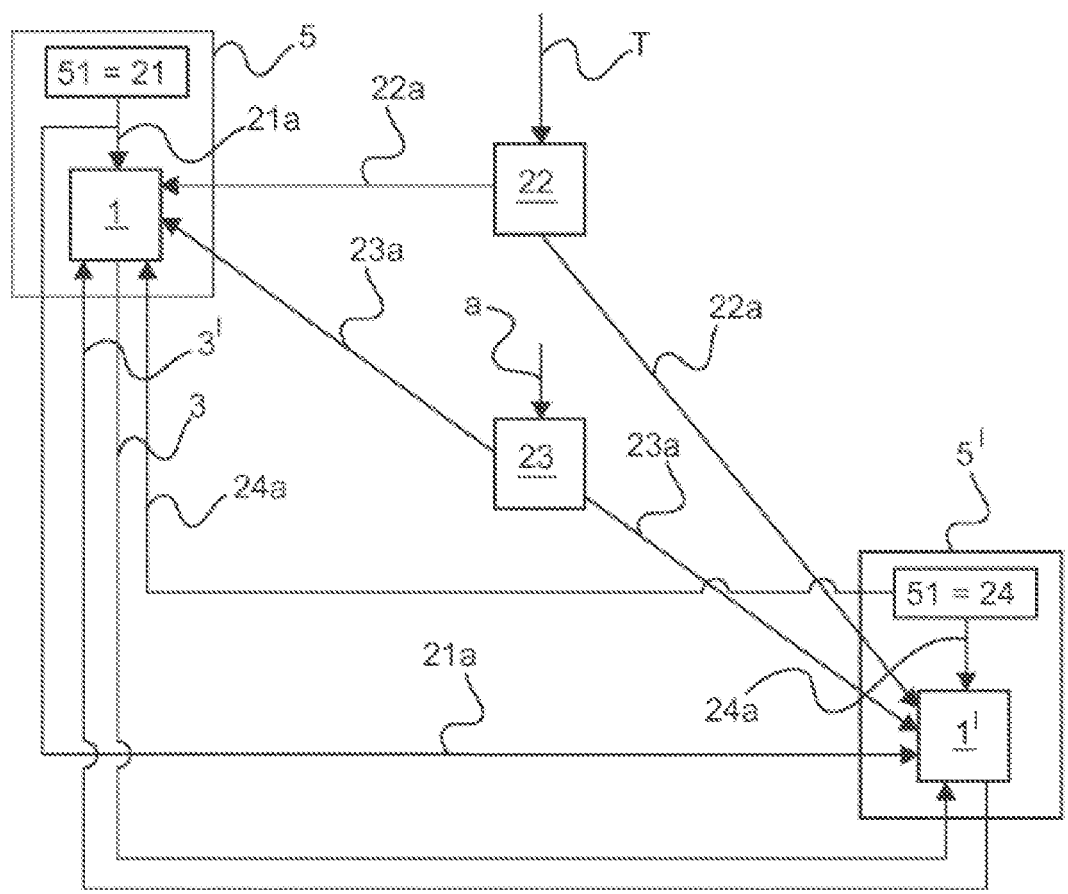
Figure 3:
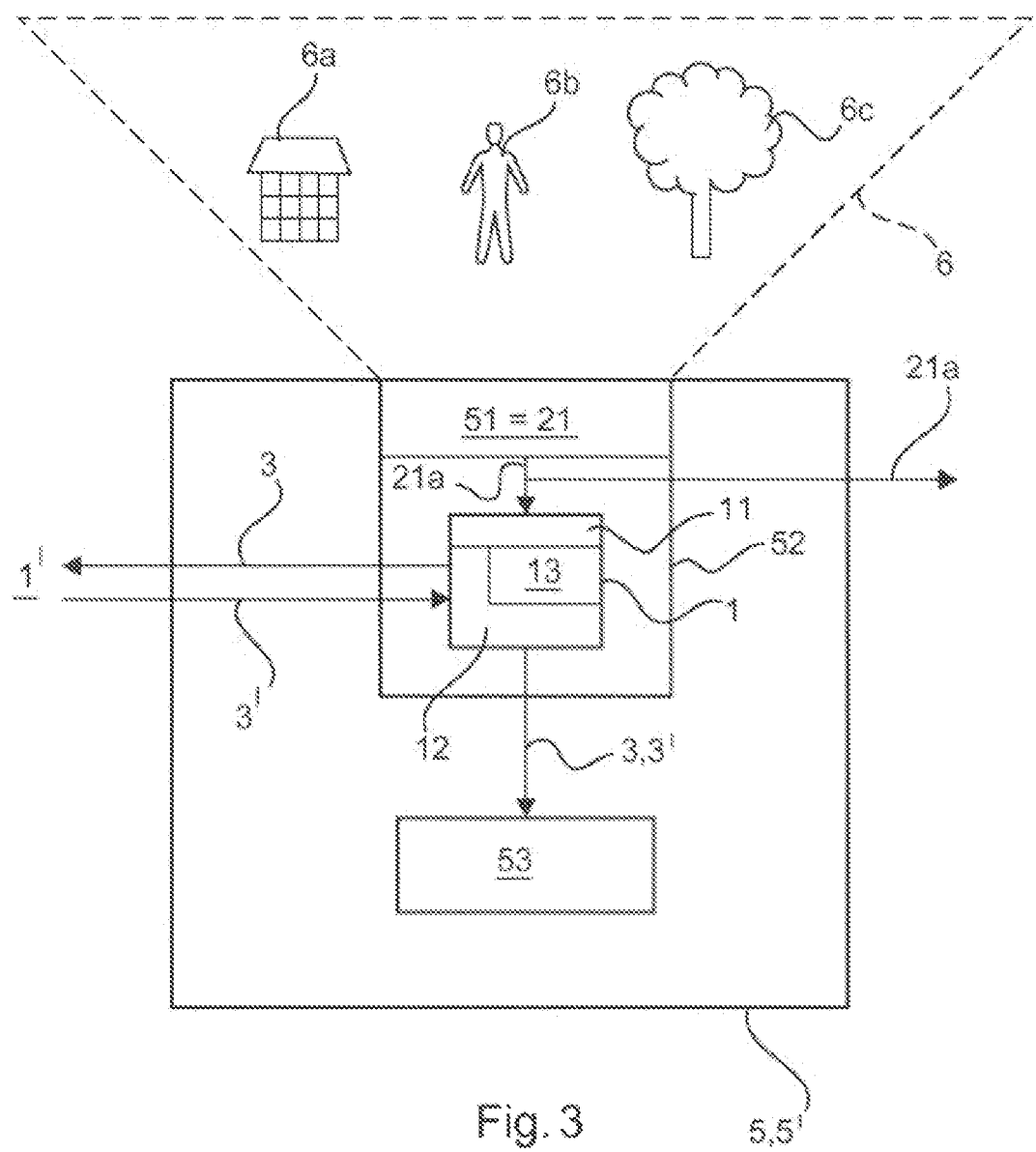
Figure 4:
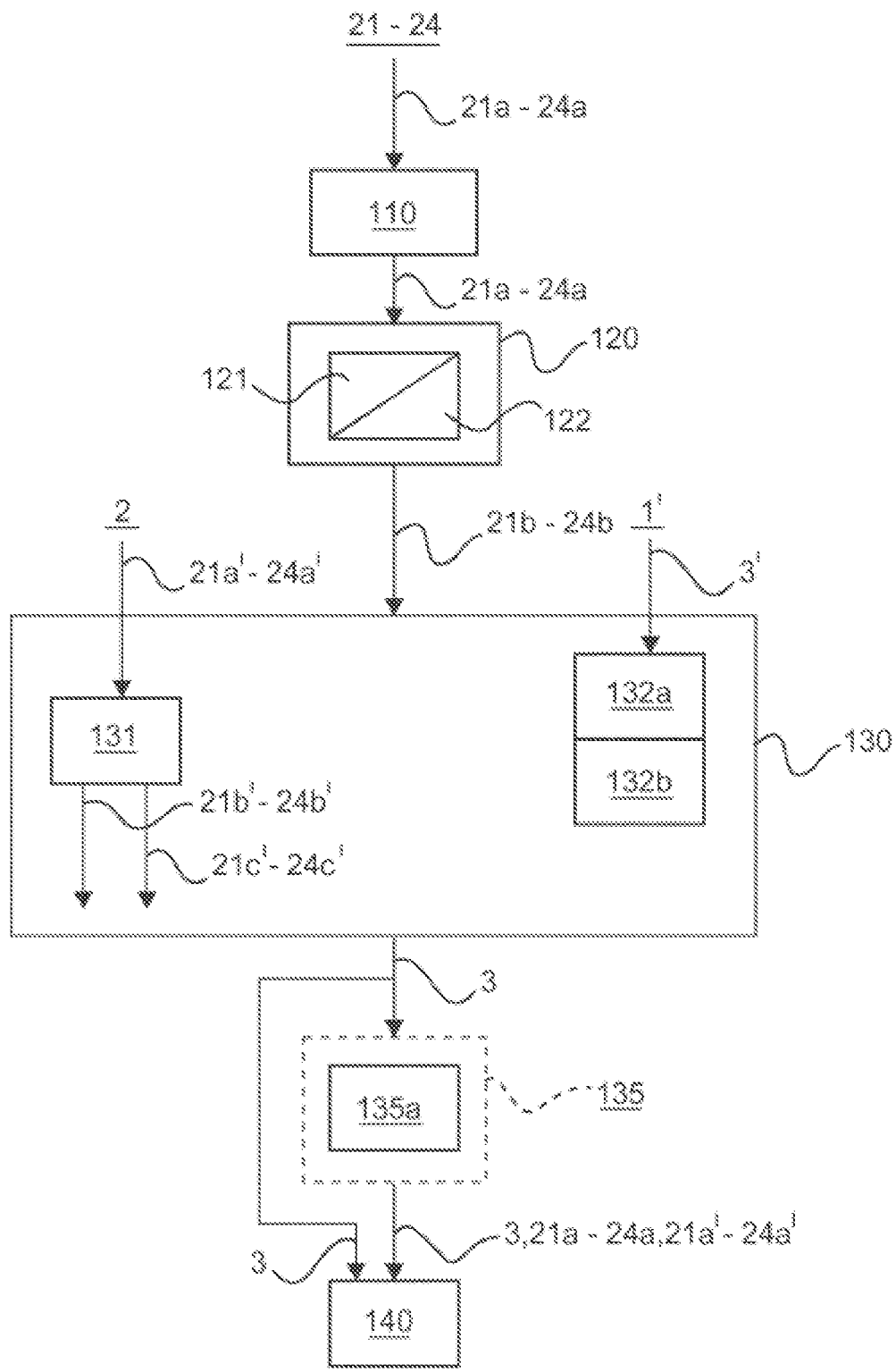

The subject matter of the invention is explained below by means of figures, without the subject matter of the invention being limited thereby. It shows:

FIG. 1: an exemplary embodiment of the authentication module 1;

FIG. 2: an exemplary sensor network with two authenticating cameras 5 and 5';

FIG. 3: an exemplary embodiment of a camera 5, 5';

FIG. 4: an exemplary sequence of the processes in the authentication module 1.

FIG. 1 shows schematically an exemplary embodiment of the authentication module 1. The authentication module 1 receives data sets 21a-24a from sensors 21-24 via its data interface 11. By way of distinction, data sets that were recorded at an earlier point in time in time series 2 ordered according to time t are denoted with reference numerals 21a'-24a'.

The authentication module 1 forms in its authentication logic 13 for the data sets 21a-24a, 21a'-24a' respectively compressed products 21b-24b, 21b'-24b', wherein a secret key 14a from a trusted platform module 15 of the authentication module 1 can be used. The compressed products 21b-24b, 21b'-24b' are included in the authentications 3 together with references 21c-24c, 21c'-24c' to the respective data sets 21a-24a, 21a'-24a'. The authentications 3 are stored in a memory 18 of the authentication module 1 and, at the same time, are output via the authentication interface 12, among others to other authentication modules 1'. Conversely, authentications 3' are received by the further authentication modules 1' and are stored in the memory 18. These external authentications 3' can also be included in the authentications 3 created by the authentication module 1 itself.

The authentications 3 can be embedded steganographically in one or more of the data sets 21a-24a, 21a'-24a', wherein a secret key 14b from the trusted platform module 15 of the authentication module 1 can also be used, again.

FIG. 2 shows an exemplary sensor network with two cameras 5 and 5', a sensor 22 for a temperature T and a sensor 23 for an acceleration a. The first camera 5 contains an image sensor 51 which functions as a sensor 21 in the sensor network. The second camera 5' also contains an image sensor 51, which functions as a sensor 24 in the sensor network. Furthermore, both cameras 5, 5' respectively contain an authentication module 1, 1'.

The authentication modules 1, 1' respectively collect the data sets 21a-24a of all sensors 21-24 involved and create associated authentications 3, 3'. The authentication modules 1, 1' also exchange these authentications 3, 3' among each other. All authentications 3, 3' are therefore present in both cameras 5, 5'. Anyone who intends to subsequently falsify one of the data sets 21a-24a created by one of the sensors 21-24 unnoticed or to conceal its existence would have to manipulate the authentications 3, 3' on both cameras 5, 5' to do so. He would not only have to overcome the corresponding safeguards and, for example, gain access to the secret keys 14a, 14b in the respective trusted platform module 15, but would first have to physically access both cameras 5, 5'. Thus, when implementing the sensor network, the security can be significantly increased again by mounting at least one of the cameras 5, 5' at a location that is particularly difficult to reach physically, for example only with a lifting platform or a similar special tool. The authentications 3, 3' could in principle be destroyed by destroying both cameras 5, 5', for example by firing from a rifle, but the attempt at manipulation would then be obvious. A manipulation is only really successful if it is carried out without leaving any physical traces.

FIG. 3 shows an exemplary camera 5, 5' in a schematic drawing. The camera 5, 5' monitors an area 6 in which, for example, a building 6a and a tree 6c are located here. In the situation represented in FIG. 3, a person 6b is also located in the area 6.

The image sensor 51, which functions as a sensor 21 in the sensor network, supplies images as data sets 21a, which are initially output from the camera 5, 5', in order, for example, to be displayed on a monitor in a security center not shown in FIG. 3 and/or recorded there. In addition, the data sets 21a are supplied to the data interface 11 of an authentication module 1 implemented directly on the image processing chip 52 of the camera 5, 5'. The authentication logic 13 of the authentication module 1 creates authentications 3, which are output via the authentication interface 12, stored in a memory 53 of the camera 5, 5' and are also transmitted to further authentication modules 1' in the sensor network. Conversely, the authentication module 1 also accepts authentications 3' from the further authentication modules 1' via its authentication interface 12 and stores them in the memory 53.

FIG. 4 illustrates an exemplary sequence of the processes in the authentication module 1. The data sets 21a-24a are obtained from the sensors 21-24 in step 110. Associated compressed products 21b-24b are created in step 120. According to block 121, these can be hash values, and according to block 122, these hash values can be calculated using a secret key 14a of the authentication module 1.

In step 130, the authentications 3 are created. Thereby, according to block 131, data sets 21a'-24a' can additionally flow in that are further back in the time series 2 by creating corresponding compressed products 21b'-24b' of these data sets 21a'-24a' and references 21c'-24c' to these data sets 21a'-24a'.

In addition, external authentications 3' can be received from other authentication modules 1' and stored in accordance with block 132a. The external authentications 3' can, however, also be included in the own authentications 3 created by the authentication module 1 in accordance with block 132b. This can be done, for example, by creating compressed products of the external authentications 3'.

The authentications 3 are output in step 140 via the authentication interface 12.

Optionally, the authentications 3 can previously be stored in step 135 by steganographic modification of the data sets 21a-24a, 21a'-24a' in these data sets 21a-24a, 21a'-24a', wherein a secret key 14b of the authentication module 1 can be used in accordance with block 135a. The steganographically modified data sets 21a-24a, 21a'-24a', which contain the authentications 3, are then output via the authentication interface 12.

LIST OF REFERENCE NUMERALS 1, 1' Authentication modules
11 Data interface of the authentication module 1, 1'
12 Authentication interface of the authentication module 1, 1'
13 Authentication logic of the authentication module 1, 1'
14a Secret key for calculating compressed products 21b-24b
14b Secret key for steganography in data sets 21a-24a
15 Trusted platform module of the authentication module 1
18 Memory of the authentication module 1
2 Time series of sensor data
21-24 Sensors
21a-24a Current data sets, supplied by sensors 21-24
21b-24b Compressed products of the data sets 21a-24a
21c-24c References to data sets 21a-24a
21a'-24a' Previous data sets from sensors 21-24 in the time series 2
21b'-24b' Compressed products of the data sets 21a'-24a'
21c'-24c' References to data sets 21a'-24a'
3, 3' Authentications
5, 5' Cameras
51 Image sensor of the camera 5, 5'
52 Image processing chip of the camera 5, 5'
53 Memory of the camera 5, 5'
6 Area captured by camera 5, 5'
6a Building in area 6
6b Person in area 6
6c Tree in area 6
110 Receiving data sets 21a-24a
120 Forming the compressed products 21b-24b
121 Forming a hash value as a compressed product 21b-24b
122 Using a secret key 14a for the compressed product 21b-24b
130 Creating authentications 3
131 Including previous data sets 21a'-24a'
132a Storing external authentications 3'
132b Including external authentications 3' with the own authentication 3
135 Steganographic modifying of data sets 21a-24a, 21a'-24a'
135a Using a secret key 14b for steganography 135
140 Outputting of the authentications 3
a Acceleration
t Time
T Temperature

The invention claimed is:

1. An authentication module for a time series of sensor data, comprising:
at least one data interface which can be connected to at least one sensor;
an authentication interface and an authentication logic, which is coupled to the data interface and the authentication interface, wherein the authentication logic is implemented by a computer processor by accessing instructions stored on a non-transitory computer-readable storage medium configured to cause the computer processor to:
receive at least one data set via the at least one data interface from at least one sensor,
form one or more compressed products from one or more received data sets,
create an authentication which contains the compressed products and respectively contains a reference to the associated data set, or at least a part of the associated data set,
receive and store authentications from other authentication modules or include them in the authentication, wherein these other authentication modules are external to the authentication module,
output the authentication via the authentication interface;
wherein at least one of the other authentication modules comprises:
at least another data interface which can be connected to at least another sensor;
another authentication interface and another authentication logic which is coupled to the other data interface and the other authentication interface, wherein the other authentication logic is configured to:
receive another data set via the other data interface from the other sensor,
form another compressed product from the other data set,
create another authentication which contains the other compressed products and respectively contains another reference to the associated data set, or at least a part of the associated data set, and
output the other authentication via the other authentication interface.

2. The authentication module according to claim 1, wherein the authentication logic is additionally configured to include a reference to at least one data set earlier in the time series, or a compressed product of this earlier data set in the authentication.

3. The authentication module according to claim 1, wherein the authentication logic is configured to form a hash value as a compressed product.

4. The authentication module according to claim 3, wherein the hash value is a keyed hash message authentication code, which is calculated using a secret key of the authentication module.

5. The authentication module according to claim 1, wherein the authentication logic is configured to store the authentication in the data set by steganographic modification of a data set received by a sensor.

6. The authentication module according to claim 5, wherein the authentication logic is configured to calculate the steganographic modification using a secret key of the authentication module.

7. The authentication module according to claim 6, comprising a trusted platform module with the secret key of the authentication module.

8. The authentication module according to claim 1, wherein the authentication logic is configured to form compressed products from combinations of one or more received data sets with at least part of the firmware of the authentication logic, or a device accommodating the authentication module.

9. The authentication module according to claim 1, wherein at least one of the authentications from other authentication modules contain other compressed products and respectively contain other references to another associated data set received from a sensor connected to at least one of the other authentication modules, or at least part of the other associated data set.

10. The authentication module according to claim 1, further comprising a radio interface, and wherein the instructions are further configured to receive another data set via the radio interface from an external sensor.

11. An authentication module for a time series of sensor data, comprising:
- at least one data interface which can be connected to at least one sensor;
- an authentication interface and an authentication logic, which is coupled to the data interface and the authentication interface, wherein the authentication logic is implemented by a computer processor by accessing instructions stored on a non-transitory computer-readable storage medium configured to cause the computer processor to:
  - receive at least one data set via the at least one data interface from at least one sensor,
  - form one or more compressed products from one or more received data sets,
  - create an authentication which contains the compressed products and respectively contains a reference to the associated data set, or at least a part of the associated data set,
  - receive and store authentications from other authentication modules or include them in the authentication, wherein these other authentication modules are external to the authentication module,
  - output the authentication via the authentication interface; and
- a selector connected between the data interface and the authentication logic, which either sends the received data sets forward to the authentication logic according to at least one predetermined criterion or suppresses this forwarding.

* * * * *